US011689636B2

(12) United States Patent
Wodrich et al.

(10) Patent No.: US 11,689,636 B2
(45) Date of Patent: Jun. 27, 2023

(54) DELEGATING NETWORK DATA EXCHANGE

(71) Applicant: INTERNATIONAL BUSINESS MACHINES CORPORATION, Armonk, NY (US)

(72) Inventors: Aaron T. Wodrich, Buckeye, AZ (US); Miguel Angel Beher Valdivia, Fulton, GA (US); Kaleb Walton, Byron, MI (US); George Bigwood, Livonia, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/567,095

(22) Filed: Sep. 11, 2019

(65) Prior Publication Data

US 2021/0075880 A1 Mar. 11, 2021

(51) Int. Cl.
*H04L 67/568* (2022.01)
*H04L 67/06* (2022.01)
*H04L 67/62* (2022.01)

(52) U.S. Cl.
CPC ............ *H04L 67/568* (2022.05); *H04L 67/06* (2013.01); *H04L 67/62* (2022.05)

(58) Field of Classification Search
CPC ... H04L 67/2842; H04L 67/325; H04L 67/02; H04L 65/4084; H04L 29/08801; H04L 45/742; H04L 49/252; H04L 67/1014; H04L 67/2838; G06F 16/9574; H04N 21/23106; H04N 21/2393

See application file for complete search history.

(56) References Cited

U.S. PATENT DOCUMENTS

| | | | |
|---|---|---|---|
| 7,003,554 B1 | 2/2006 | Turner | |
| 11,411,849 B1* | 8/2022 | Abd Al Hadi | ........ H04L 43/067 |
| 2007/0288967 A1 | 12/2007 | Candelore | |
| 2009/0235244 A1 | 9/2009 | Enomori | |
| 2011/0294502 A1* | 12/2011 | Oerton | .................... H04W 4/50 |
| | | | 455/426.1 |
| 2012/0173857 A1 | 7/2012 | Kobraei | |
| 2013/0080865 A1* | 3/2013 | Palm | ................... G06F 16/9577 |
| | | | 715/202 |

(Continued)

FOREIGN PATENT DOCUMENTS

JP 5349650 B2 11/2013

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Hitesh Patel
(74) *Attorney, Agent, or Firm* — L. Jeffrey Kelly

(57) ABSTRACT

A method, a computer program product, and a computer system include a requesting device delegating a delegated device to download data. During a first time when the requesting device and the delegated device are connected to a first network, the method includes receiving a proxy download request from the requesting device. During a second time when the delegated device is connected to a second network, the second time being after the first time, the method includes receiving a download based on the proxy download request via the second network.

15 Claims, 7 Drawing Sheets

(56) References Cited

U.S. PATENT DOCUMENTS

| | | | | |
|---|---|---|---|---|
| 2015/0023159 A1* | 1/2015 | Alisawi | .................. | H04L 67/28 |
| | | | | 370/230 |
| 2016/0094611 A1* | 3/2016 | Chow | ..................... | H04L 67/02 |
| | | | | 709/203 |
| 2016/0174110 A1* | 6/2016 | Sharma | ................ | H04W 48/18 |
| | | | | 370/331 |
| 2020/0242934 A1* | 7/2020 | Xu | ..................... | G01C 21/3685 |
| 2020/0314208 A1* | 10/2020 | Meenan | ................. | H04L 67/56 |

OTHER PUBLICATIONS

Playstation, "Can I download Saves/Updates to my ps3, straight from my Android device?", https://gamefaqs.gamespot.com/ps3/927750-playstation-3/answers/3463 . . . , printed Jun. 26, 2019, pp. 1-3.

* cited by examiner

METHOD
300

DELEGATING NETWORK DATA EXCHANGE

BACKGROUND

The exemplary embodiments relate generally to data exchange, and more particularly to delegating network file downloads between devices that utilize a common network.

A network may have a plurality of different devices associated thereto to facilitate communications. The communications may include data exchange within the network via an intranet (e.g., between end devices directly associated with the network, with network components of the network, etc.) or outside the network via an internet (e.g., with other networks, further devices having access to the network, etc.). The network may have various limitations based on capacity, capability, throughput, subscription parameters, etc. When the network is data capped that limits an amount of data that may be exchanged via the internet over a period of time (e.g., at a preferred throughput rate), additional data exchanged over the internet beyond the limit set by the data cap during the period of time may entail overages or require workarounds that may or may not be available. Select devices associated with the network may also be stationary that forces these select devices to only connect to the network having an operating area that covers a position of the select devices. There may be a variety of reasons for data exchanges with the internet over the data capped network to be performed. When the data exchange is for operating parameters of the device (e.g., updating an operating system, patches to correct performance errors, etc.), a user may be required to manually handle the data cap limitation in managing when the data exchanges occur or allow for overages to happen.

SUMMARY

The exemplary embodiments disclose a method, a computer program product, and a computer system for a requesting device to delegate a delegated device to download data. During a first time when the requesting device and the delegated device are connected to a first network, the method comprises receiving a proxy download request from the requesting device. During a second time when the delegated device is connected to a second network, the second time being after the first time, the method comprises the receiving a download based on the proxy download request via the second network.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
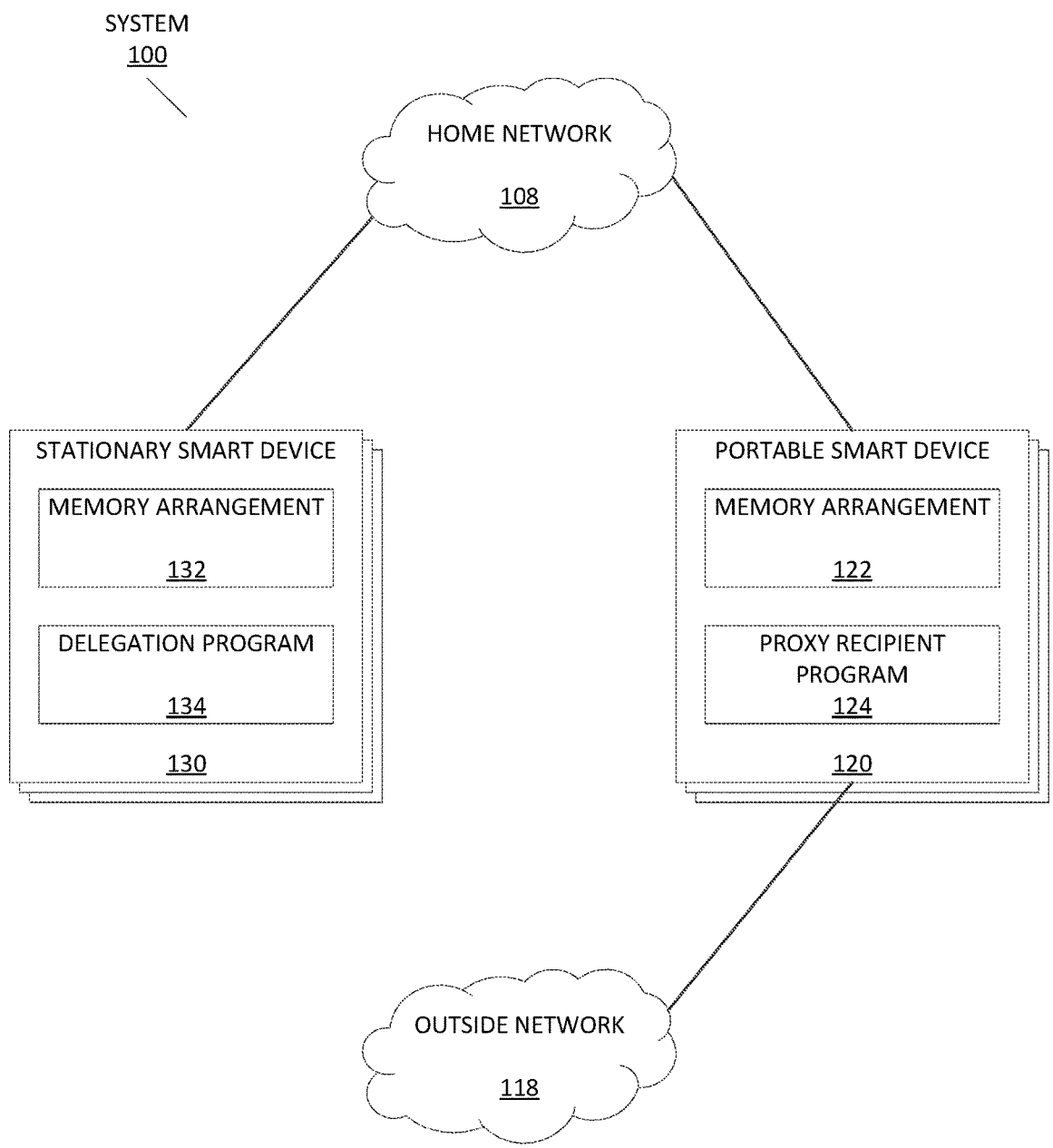
FIG. 1 depicts an exemplary schematic diagram of a delegation system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for a requesting smart device to delegate a data exchange on a delegated smart device. When the requesting smart device is limited to a data capped network and while the requesting and delegated smart devices are connected to the data capped network, the requesting smart device may request that the delegated smart device perform a data exchange on behalf of the requesting smart device. As will be described in greater detail below, the exemplary embodiments are configured to allow the requesting smart device to determine when a data exchange (e.g., a download that would be required to be received over an internet by the requesting smart device) may instead be requested to be downloaded by the delegated smart device. The delegated smart device is configured to access at least one further network from which the download is received (e.g., being portable and moving into an operating area of the at least one further network). As a result of the delegated smart device serving as a proxy recipient for the requested data exchange and after the delegated smart device has received the download using the further network, the delegated smart device may transmit the download to the requesting smart device when the delegated smart device has returned to the data capped network. Key benefits of the exemplary embodiments may include providing a mechanism that enables the requesting smart device to receive data without utilizing the internet via the data capped network while maintaining a relatively similar financial responsibility by minimizing overages that may occur as well as minimizing manual intervention. Detailed implementation of the exemplary embodiments follows.

There may be a plurality of devices connected to a data capped network that utilizes an available internet data limit for exchanging data over the internet. The devices may be personal devices (e.g., a smart phone, a tablet, etc.), console devices (e.g., a gaming console), appliances (e.g., a refrigerator, an oven, a television, etc.), etc. In using the data capped network, the user may be required to selectively use the available internet data limit for data exchanges or accept penalties. For example, the user may simply utilize the data capped network and accept overages corresponding to an amount of internet data being exchanged above the internet data limit imposed by a subscribed plan with the data capped network. In another example, the user may upgrade the subscription that increases the internet data limit of the amount of data allowed to be exchanged over the internet. However, in these scenarios, the user must accept an increased financial responsibility. Those skilled in the art will appreciate that overages may incur further costs than subscribing to a plan with a higher internet data limit, an option that may be forced onto the user if no further plans that raise the internet data limit are available.

The user may also attempt to manually perform various actions to utilize the data capped network while remaining under the internet data limit for data exchanges. For example, the user may utilize a portable memory arrangement (e.g., a USB stick) to transfer data received on a first device (e.g., that does not contribute to the internet data limit using the data capped network) to a second device that requires the data. However, the second device is required to have an access to receive the data from the first device (e.g., a user accessible USB port to receive the USB stick). The second device must also be configured with a manual modification feature to perform such a data transfer while also enabling the user to provide manual inputs. However, a manufacturer of the second device may not have included such an option on the second device. In such a scenario, the user may require an authorized service call to prevent using the data capped network in accessing the internet for the data which may be costly. In another example, the user may take the device requiring data to a further network to avoid accessing the internet through the data capped network. However, the further network generally has an operating area that does not cover the position of the device, thereby necessitating the device requiring the data to be portable to enter the operating area of the further network. When the device is not readily portable (e.g., a large device such as a refrigerator), this option may not be available or feasible. In a further example, the user may tether and switch to a different provider. However, this option merely transports the issues of the data capped network from a first provider to a second provider. In yet another example, the user may select to refuse a request for a data exchange from a device connected to the data capped network. However, this option requires a feature for a manual input to refuse the data exchange be configured on the device and available to the user. Furthermore, such an action may be prohibitively risky, even dangerous for certain appliances in terms of functionality (e.g., an update that resolves an issue that may cause damage). In an additional example, the user may select to delay a request for a data exchange from a device connected to the data capped network. Thus, when the user is away or when the data capped network is not in use, the device may request the data on the internet over the data capped network. However, this also requires that a manual input be entered based on the assumption that such an option is available. Furthermore, this action may be risky and challenging, particularly to an average user who is not versed with the platform on which the device operates.

There have been further conventional approaches to address managing data exchanges by devices connected to a network. However, these conventional approaches do not consider data capped networks having an internet data limit. For example, a device that is requesting a data exchange on the internet over the data capped network may be configured with a resume capability in which data is received piecemeal rather than over a single download session. However, this approach still requires that the data be received from the internet using the data capped network. In another example, a device may be configured to update software using a home energy manager to save energy in which an operation to update the software may be performed without entering a home. The home energy manager may be external of the device requesting the data that updates the software. However, the home energy manager is associated with the same network on which the device requesting the data is also connected (e.g., the data capped network). Thus, the data that is received by the home energy manager would be through the data capped network in accessing the internet. In a further example, requests for data from a plurality of different devices connected to a network may be managed rather than performed individually by each of the devices. However, such an approach also utilizes the network on which the devices are connected (e.g., the data capped network). Thus, the data that is received by a management server that manages the data requests would be through the data capped network in accessing the internet.

The exemplary embodiments are configured to enable a non-portable network device (e.g., a requesting smart device) on a data capped network to delegate an internet download to a portable network device (e.g., a delegated smart device) during a time when the non-portable network device and the portable network device are connected to the data capped network. At a subsequent time, while the portable network device has established a connection to a further network, the portable network device may receive the delegated internet download. The exemplary embodiments may take advantage of data exchanges performed over the intranet being substantially unlimited. Thus, after the delegated internet download is entirely received and the portable device has returned to the data capped network, the portable network may transmit the delegated internet download to the non-portable network through the intranet of the data capped network without impacting an internet data limit associated with the data capped network. The exemplary embodiments may provide an automated process by which the internet downloads are delegated and ultimately received by the non-portable network device. The exemplary embodiments may also utilize the automated process conditionally when the exemplary embodiments identify that the network to which the non-portable device is connected is a data capped network.

The exemplary embodiments are described with regard to a data capped network, a portable network device, and a non-portable network device. However, the limits imposed by the data capped network and whether a network device is portable or not provide an illustrative scenario in which the exemplary embodiments may be implemented. Thus, the exemplary embodiments being described with regard to the data capped network, the portable network device, and the non-portable network device are only for illustrative purposes. For example, the non-portable network device may represent any device that may remain connected to a first network. The portable network device may represent any device that may connect to the first network and at least one additional network. The data capped network may represent any network to which the non-portable network device and the portable network device may connect. The exemplary embodiments may be implemented on any network in which an efficiency of the network may be improved based on a variety of parameters (e.g., decreasing internet data exchanges, maintaining an available bandwidth for applications requiring more immediate resolution of data exchange requests, etc.).

FIG. 1 depicts a delegation system 100, in accordance with the exemplary embodiments. The delegation system 100 may be used in any location that includes a network to which a plurality of devices is connected (e.g., a home, an office, etc.). According to the exemplary embodiments, the delegation system 100 may include one or more portable smart devices 120 and one or more stationary smart devices 130, which may be interconnected via a home network 108. The delegation system 100 may also include an outside network 118 to which the portable smart devices 120 may establish a connection. The portable smart devices 120 may connect to the home network 108, the outside network 118, or to both networks simultaneously. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the home network 108 and the outside network 118 may each be a communication channel capable of transferring data between connected devices. Accordingly, the components of the delegation system 100 may represent network components or network devices interconnected via the home network 108 and/or the outside network 118. In the exemplary embodiments, the network 108 may be an intranet in which the portable smart device 120 may exchange data with the stationary smart device 130. The network 108 may also connect to further networks such as the Internet, representing a worldwide collection of networks and gateways to support communications between devices connected to the Internet. The outside network 118 may be the Internet over which the portable smart device 120 may exchange data when connected thereto. In a particular exemplary embodiment, a user associated with the portable smart device 120 and the stationary smart device 130 may have a subscription with the home network 108. The user may be unassociated with the outside network 118 such as when the outside network 118 is a publicly available network (e.g., a guest connection to a WiFi network at a public establishment). Moreover, the network 108 and the network 118 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 and the network 118 may be a telecommunications network used to facilitate telephone calls between two or more parties comprising a landline network, a wireless network, a closed network, a satellite network, or a combination thereof. In general, the network 108 and the network 118 may represent any combination of connections and protocols that will support communications between connected devices. For example, the network 108 and the network 118 may also represent direct or indirect wired or wireless connections between the components of the delegation system 100 that do not utilize the network 108 or the network 118.

In the exemplary embodiments, the portable smart device 120 may include a memory arrangement 122 and a proxy recipient program 124 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The portable smart device 120 may be portable to move from one location to another, particularly to connect to the home network 108 by moving into an operating area of the home network 108 and to connect to the outside network 118 by moving into an operating area of the outside network 118. When configured with a cellular capability, the portable smart device 120 may be connected to the home network 108 which may be a WiFi network and to the outside network 118 which may be a cellular network. While the portable smart device 120 is shown as a single device, in other embodiments, the portable smart device 120 may be comprised of a cluster or plurality of computing devices, in a modular manner, etc., working together or working independently. The portable smart device 120 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the memory arrangement 122 may be configured to store data received by the portable smart device 120 while connected to the home network 108 and/or the outside network 118. As will be described in further detail below, the portable smart device 120 may receive a request from the stationary smart device 130 while the portable smart device 120 and the stationary smart device 130 are both connected to the home network 108. The portable smart device 120 may also receive a download from the outside network 118 for data corresponding to the request. The request and the download may be stored in the memory arrangement 122.

According to the exemplary embodiments, the proxy recipient program 124 may be a software, hardware, and/or firmware based application capable of being delegated a data exchange by the stationary smart device 130 via the home network 108 and the outside network 118. In the exemplary embodiments, the proxy recipient program 124 may passively operate with one or more components of the delegation system 100 to exchange data requested by the stationary smart device 130 without requiring any user intervention, and utilize various wired and/or wireless connection protocols for data transmission and exchange associated with delegating a data exchange, including Bluetooth, 2.4 gHz and 5 gHz internet, near-field communication, Z-Wave, Zigbee, etc.

The proxy recipient program 124 may be configured to perform a plurality of operations associated with the portable smart device 120 being delegated to perform a data exchange when requested by the stationary smart device 130. The operations that are performed by the proxy recipient program 124 may depend on the network to which the portable smart device 120 is connected.

For example, while connected to the home network 108, the proxy recipient program 124 may initially broadcast a discovery signal for the stationary smart device 130 to determine when the portable smart device 120 has connected to the home network 108. For example, the discovery signal may be broadcast through the home network 108. In another example, the discovery signal may be broadcast using short-range communications when the stationary smart device 130 is configured with short-range communication protocols (e.g., Bluetooth).

In another example, while connected to the home network 108, the proxy recipient program 124 may receive a proxy download request from the stationary smart device 130. The proxy download request may indicate a download that the stationary smart device 130 is to receive from a source on the Internet. The proxy download request may include an identifier associated with the stationary smart device 130 (e.g., when a plurality of stationary smart devices 130 utilize the delegation feature according to the exemplary embodiments) and the data that is to be received from requesting the portable smart device 120 (e.g., a source or locator such as a URL in which to receive the download). The proxy download request may also include any accessing information (e.g., user identification information, password information, a serial number specific to the stationary smart device 130, etc.) to verify that the download may be received. The proxy download request may also include further information such as a relative urgency with which the download is to be received, a timestamp of when the download was available from the source, a number of times that the stationary smart device 130 has requested a delegation of the download, a size of the download, etc.

When the proxy recipient program 124 has received the proxy download request, the proxy recipient program 124 may manage a queue, particularly if the proxy recipient program 124 is configured to manage a plurality of proxy download requests from one or more stationary smart devices 130 configured to utilize the delegation feature according to the exemplary embodiments. The proxy recipient program 124 may determine a placement of the proxy download request within the queue. For example, based on the additional information included in the proxy download request, the proxy recipient program 124 may utilize a priority standard that establishes a priority of the proxy download requests already in the queue and the proxy download request that was received. The priority may be, for example, a size of the download, a relative urgency with which the download is to be received by the requesting stationary smart device 130, etc. In another example, the proxy recipient program 124 may utilize a default standard in which proxy download requests are processed based on when the proxy download requests were received. In a further example, a combination of the above standards may be used such as proxy download requests having a similar or equal priority being prioritized based on a timestamp of when the proxy download requests were received. In yet another example, a user may manually set the prioritization of the queue based on various standards, manually selecting an order with which to receive downloads corresponding to the proxy download requests in the queue, etc.

In a further example, while connected to the home network 108, the proxy recipient program 124 may determine whether a download has completed from the outside network 118 for a proxy download request in the queue. As a result of the proxy recipient program 124 receiving a proxy download request and at a time when the portable smart device 120 has established a connection to the outside network 118, the proxy recipient program 124 may have received a portion or an entirety of a download corresponding to the proxy download request. When an entirety of a download has been received, the proxy recipient program 124 may remove the corresponding proxy download request from the queue. When the portable smart device 120 has connected to the home network 108, the proxy recipient program 124 may receive a request for the download from the stationary smart device 130 (e.g., the stationary smart device 130 has determined that the portable smart device 120 has returned to the home network 108 at a time subsequent to when the stationary smart device 130 has transmitted the proxy download request). The proxy recipient program 124 may determine whether an entirety of the download has been received. As a result of the entirety of the download being stored in the memory arrangement 122, the proxy recipient program 124 may transmit the download to the stationary smart device 130. When the download has completely been transmitted to the stationary smart device 130, the proxy recipient program 124 may delete the download from the memory arrangement 122. If an entirety of the download is not stored in the memory arrangement 122, the proxy recipient program 124 may process further requests for downloads and/or provide an indication that the download is incomplete.

In yet another example, while connected to the outside network 118, the proxy recipient program 124 may identify the one or more proxy download requests in the queue. The proxy recipient program 124 may determine whether there are any proxy download requests and begin requesting the data corresponding to the proxy download requests based on the priority with which the proxy download requests are included in the queue. When properly configured, the proxy recipient program 124 may request a plurality of data corresponding to respective proxy download requests. However, the proxy recipient program 124 may dynamically determine when to selectively receive one or a plurality of data based on various factors (e.g., a transmit rate of the outside network 118 for one or more data requests, an available storage capacity of the memory arrangement 122, etc.). For a duration that the portable smart device 120 is connected to the outside network 118, the proxy recipient program 124 may receive data corresponding to the proxy download requests. The proxy recipient program 124 may be configured to receive the data in a piecemeal manner. For example, should the portable smart device 120 disconnect from the outside network 118, the proxy recipient program 124 may store the portion of the data that was received in the memory arrangement 122. At a subsequent time, the proxy recipient program 124 may receive a remainder of the data when a further connection to the outside network 118 is established.

In the exemplary embodiments, the stationary smart device 130 may include a memory arrangement 132 and a delegation program 134 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. In a particular exemplary embodiment, the stationary smart device 130 may be an appliance or other device that stays in a substantially similar position. In another particular exemplary embodiment, the stationary smart device 130 may be configured with a WiFi capability to connect to the home network 108. Thus, the stationary smart device 130 may remain within an operating area of the home network 108. While the stationary smart device 130 is shown as a single device, in other embodiments, the stationary smart device 130 may be comprised of a cluster or plurality of computing devices, in a modular manner, etc., working together or working independently. The stationary smart device 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the memory arrangement 132 may be configured to store data received by the stationary smart device 130 while connected to the home network 108. As will be described in further detail below, the stationary smart device 130 may receive information from the portable smart device 120 regarding a status of a download that has been delegated to the portable smart device 120 while the portable smart device 120 and the stationary smart device 130 are both connected to the home network 108. The stationary smart device 130 may also receive a download from the portable smart device 120 over the home network 108 when the portable smart device 120 has received the download. The information and the download may be stored in the memory arrangement 132.

According to the exemplary embodiments, the delegation program 134 may be a software, hardware, and/or firmware based application capable of delegating a data exchange to the portable smart device 120 via the home network 108. In the exemplary embodiments, the delegation program 134 may passively operate with one or more components of the delegation system 100 to exchange data requested by the stationary smart device 130 without requiring any user intervention, and utilize various wired and/or wireless connection protocols for data transmission and exchange associated with delegating a data exchange, including Bluetooth, 2.4 gHz and 5 gHz internet, near-field communication, Z-Wave, Zigbee, etc.

The delegation program 134 may be configured to perform a plurality of operations associated with the stationary smart device 130 delegating a data exchange to be performed by the portable smart device 120. The operations that are performed by the delegation program 134 may depend on the portable smart device 120 being connected to the same network to which the stationary smart device 130 is connected (e.g., the home network 108).

The delegation program 134 may monitor for when the portable smart device 120 is connected to the home network 108. For example, the delegation program 134 may determine when a discovery signal associated with the portable smart device 120 is detected. As a result of the discovery signal being detected, the delegation program 134 may determine whether a proxy download request from the stationary smart device 130 is in the queue of the portable smart device 120. As a result of the proxy recipient program 124 only adding proxy download requests into the queue when received from the delegation program and the proxy recipient program 124 removing the proxy download request from the queue when a corresponding download has completed, the presence of the proxy download request in the queue may provide certain indications. For example, when the proxy download request from the delegation program 134 is in the queue, the delegation program 134 is aware that the proxy download request was previously transmitted to the portable smart device 120. In another example, when the proxy download request from the delegation program 134 is absent from the queue, the delegation program 134 is aware that the proxy download request was not previously transmitted to the portable smart device 120 or the download corresponding to a previously transmitted proxy download request has completed.

As a result of the proxy download request from the delegation program 134 being absent from the queue, the delegation program 134 may determine whether the proxy download request was previously transmitted to the portable smart device 120. If the proxy download request was never transmitted to the portable smart device 120, the delegation program 134 may transmit a proxy download request to be added in the queue of the portable smart device 120. If the proxy download request was previously transmitted to the portable smart device 120 but is absent from the queue, the download may be complete and the delegation program 134 may request the download from the portable smart device 120 to be transmitted over the intranet of the home network 108.

If the delegation program 134 determines that a proxy download request is still in the queue of the portable smart device 120 (e.g., the proxy download request was previously transmitted and the download is incomplete and/or yet unavailable from the portable smart device 120), the delegation program 134 may determine an urgency factor to receive the download. For example, the delegation program 134 may use a time standard to define the urgency factor. The time standard may indicate a duration of time from when the download was available and a current time that the download has yet to be received. By defining an urgency threshold (e.g., a threshold time), the delegation program 134 may determine whether the delegation program 134 may continue to rely on the portable smart device 120 completing the download. If the urgency threshold is not yet satisfied (e.g., the duration of time is less than the threshold time), the delegation program 134 may continue to wait for the portable smart device 120 to complete the download. If the urgency threshold is satisfied (e.g., the duration of time is at least the threshold time), the delegation program 134 may pre-empt the delegation feature and request the download through the home network 108. The urgency factor may therefore prevent a stationary smart device 130 from waiting a significant or unacceptable amount of time to receive the download.

Figure 2:
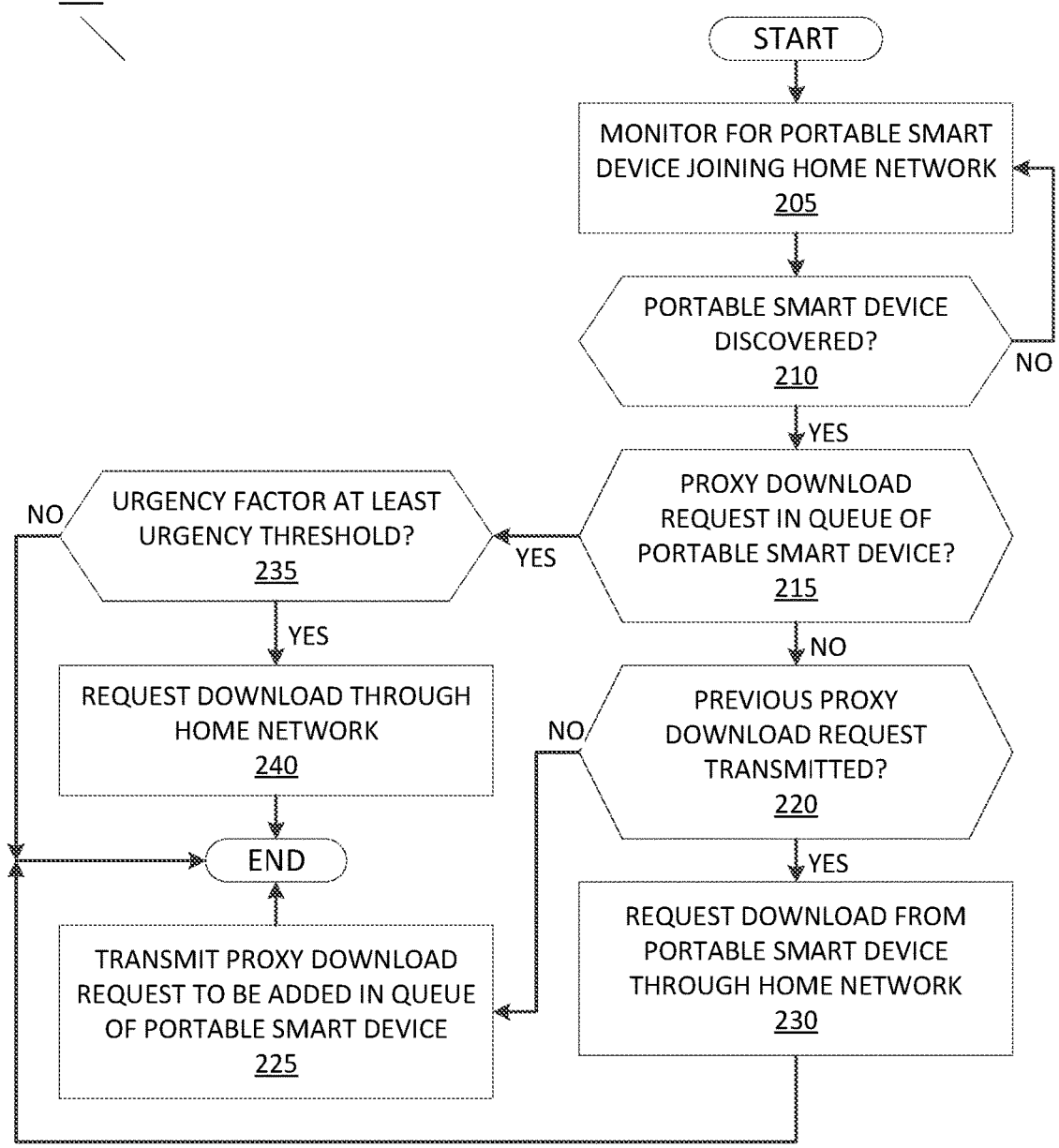
FIG. 2 depicts an exemplary flowchart of a method illustrating the operations of a delegation program 134 of the delegation system 100 in delegating a data exchange, in accordance with the exemplary embodiments.

FIG. 2 depicts an exemplary flowchart of a method 200 illustrating the operations of the delegation program 134 of the delegation system 100 in delegating a data exchange, in accordance with the exemplary embodiments. The method 200 is described based on the portable smart device 120 being configured with the proxy recipient program 124 and the stationary smart device 130 being configured with the delegation program 134.

The delegation program 134 may monitor for the portable smart device 120 joining the home network 108 (step 205). The stationary smart device 130 may remain connected to the home network 108. The portable smart device 120 may dynamically connect to the home network 108 as well as the outside network 118. Thus, the stationary smart device 130 may continuously monitor for when the portable smart device 120 is connected to the home network 108, particularly when the delegation feature according to the exemplary embodiments are to be used.

To further illustrate the operations of the delegation program 134, reference is now made to an illustrative exemplary embodiment. According to the illustrative exemplary embodiment, the stationary smart device 130 may be an appliance such as a refrigerator that is configured with smart technology. The refrigerator may be relatively large and immovable once positioned. The portable smart device 120 may be a smart phone associated with a user who lives in a house in which the refrigerator is located. The home network 108 may be a data capped network in which an internet data limit is imposed by a provider of the home network 108. Thus, data exchanged over the internet via the home network 108 may utilize the internet data limit while data exchanged over the intranet via the home network 108 may be performed freely. The outside network 118 may be the Internet.

The delegation program 134 may determine whether the portable smart device 120 has been discovered (decision 210). Upon connecting to the home network 108, the portable smart device 120 may broadcast a discovery signal via the home network 108 or other broadcast manner (e.g., short-range communications that are supported by the stationary smart device 130). The delegation program 134 may positively identify that the portable smart device 120 is or has connected to the home network 108 from receiving the discovery signal. As a result of the delegation program 134 determining that the portable smart device 120 is not connected to the home network 108 (decision 210, "NO" branch), the delegation program 134 continues to monitor for the portable smart device 120. As a result of the delegation program 134 determining that the portable smart device 120 is or has connected to the home network 108 (decision 210, "YES" branch), the delegation program 134 may continue with further operations in using the delegation feature according to the exemplary embodiments.

According to the previously introduced exemplary embodiment, the portable smart device 120 may have disconnected from the home network 108, established a connection to the outside network 118, subsequently disconnected from the outside network 118, and returned to the home network 108. As a result of rejoining the home network 108, the portable smart device 120 may broadcast the discovery signal. The delegation program 134 may detect the discovery signal and determine that the portable smart device 120 has connected to the home network 108.

The delegation program 134 may determine whether a proxy download request from the delegation program 134 is in the queue of the portable smart device 120 (decision 215). At a previous time when the portable smart device 120 and the stationary smart device 130 are connected to the home network 108, the delegation program 134 may have determined that there is a download available for the platform of the stationary smart device 130. During this time, the delegation program 134 may identify that the home network 108 is a data capped network and the delegation feature according to the exemplary embodiments is to be used. Thus, the delegation program 134 may transmit a proxy download request to be added to the queue of the portable smart device 120. Once the proxy download request is in the queue, the proxy download request may remain in the queue (e.g., the download has not been completely received by the portable smart device 120) or may be removed from the queue (e.g., the download has been completely received by the portable smart device 120). In another scenario, the delegation program 134 may not have transmitted the proxy download request (e.g., the indication that the download was available occurred at a time that the portable smart device 120 was not connected to the home network 108). As a result of the delegation program 134 determining that the proxy download request is absent from the queue of the portable smart device 120 (decision 215, "NO" branch), the delegation program 134 may determine whether the proxy download request was previously transmitted to the portable smart device 120 (decision 220).

With reference again to the previously introduced exemplary embodiment, the delegation program 134 may have previously transmitted a proxy download request at a prior time when the portable smart device 120 and the stationary smart device 130 were connected to the home network 108. Thus, the proxy download request may have been added to the queue of the portable smart device 120. Furthermore, the portable smart device 120 may have connected to the outside network 118 and completely received the download corresponding to the proxy download request.

As a result of the delegation program 134 determining that the proxy download request was not previously transmitted (decision 220, "NO" branch), the delegation program 134 may transmit a proxy download request to be added in the queue of the portable smart device 120 (step 225). In generating the proxy download request, the delegation program 134 may include various types of information (e.g., a timestamp of when the download was available, a size of the download, a relative urgency value with which the download is to be received by the stationary smart device 130, etc.).

As a result of the delegation program 134 determining that the proxy download was previously transmitted (decision 220, "YES" branch), the delegation program 134 may request the download from the portable smart device using the intranet of the home network 108 (step 230). Again, since the proxy download request was previously transmitted but is absent from the queue, the delegation program 134 may be aware that the portable smart device 120 completely received the download while connected to the outside network 118. Accordingly, the stationary smart device 130 may receive the download from the portable smart device 120 using the delegation feature according to the exemplary embodiments.

Referring now to the previously introduced, illustrative exemplary embodiment, since the download was completely received by the portable smart device 120 while connected to the outside network 118, the stationary smart device 130 may transmit the request for the download. The portable smart device 120 and the stationary smart device 130 may then use the intranet of the home network 108 for the data exchange so that the stationary smart device 130 receives the download.

Returning to decision 215, as a result of the proxy download request being in the queue of the portable smart device 120 (decision 215, "YES" branch), the delegation program 134 may determine whether an urgency factor that the download is to be received is at least an urgency threshold (decision 235). The urgency factor may be based on a variety of parameters that indicate whether the stationary smart device 130 may continue to rely on the delegation feature according to the exemplary embodiments or bypass the delegation feature. The urgency threshold may define a minimum amount of the urgency factor with which the delegation feature may be used.

With reference again to the illustrative exemplary embodiment, the urgency factor may be based on a time standard. Thus, the time standard may be according to when the download has been available for the stationary smart device 130. The time standard may use a time threshold to indicate whether the delegation feature is to be used or bypassed. For example, the time threshold may be set to one week.

As a result of the urgency factor not satisfying the urgency threshold (decision 235, "NO" branch), the delegation program 134 may continue to utilize the delegation feature according to the exemplary embodiments. As a result of the urgency factor being at least the urgency threshold (decision 235, "YES" branch), the delegation program 134 may bypass the delegation feature. Accordingly, the delegation program 134 may request the download through the home network 108 (step 240). For example, despite the home network 108 being a data capped network, the delegation program 134 may still utilize the home network 108 to access the Internet to receive the download for the stationary smart device 130.

In furtherance of the previously introduced exemplary embodiment, in an alternative scenario, the delegation program 134 may have transmitted the proxy download request to the portable smart device 120 at a previous time. The portable smart device 120 may have returned to the home network 108 one or more times. However, in each instance that the portable smart device 120 and the stationary smart device 130 were both connected to the home network 108, the download was not completely received by the portable smart device 120. The proxy download request may also include a timestamp of when the download was made available to the stationary smart device 130. The delegation program 134 may have determined that a current time is at least the time threshold of one week. Thus, the delegation program 134 may bypass the delegation feature and access the Internet via the home network 108 to receive the download directly from the source.

When the delegation program 134 bypasses the delegation feature according to the exemplary embodiments, the delegation program 134 may transmit an indication to the portable smart device 120 that the delegation program 134 is exercising the bypass option. When the portable smart device 120 receives the indication, the proxy download request from the delegation program 134 of the stationary smart device 130 may be removed from the queue. The delegation program 134 may wait until the download has completely been received directly via the home network 108 accessing the Internet to transmit the indication.

Figure 3A:
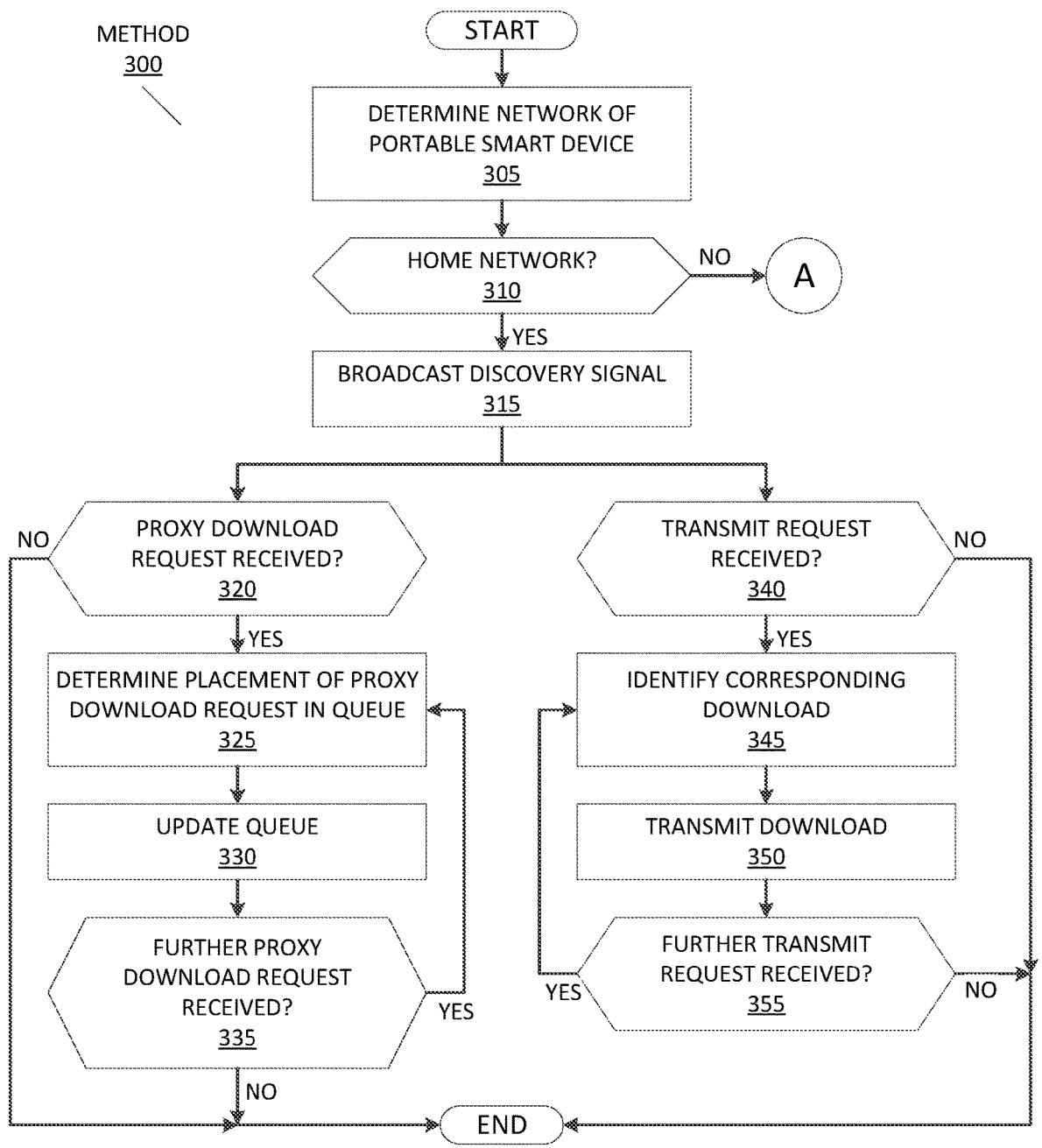
FIGS. 3A-3B depict an exemplary flowchart of a method illustrating the operations of a proxy recipient program 124 of the delegation system 100 in managing a delegated data exchange, in accordance with the exemplary embodiments.
Figure 3B:

FIGS. 3A-3B depict an exemplary flowchart of a method 300 illustrating the operations of the proxy recipient program 124 of the delegation system 100 in managing a delegated data exchange, in accordance with the exemplary embodiments. The method 300 is described based on the portable smart device 120 being configured with the proxy recipient program 124 and the stationary smart device 130 being configured with the delegation program 134.

The proxy recipient program 124 may determine a network to which the portable smart device 120 is currently connected (step 305). The portable smart device 120 may be a portable device that may move and connect to the home network 108 and/or the outside network 118. Thus, at any given moment, the portable smart device 120 may be connected to the home network 108, the outside network 118, or both the home network 108 and the outside network 118. The proxy recipient program 124 may determine whether the portable smart device 120 is connected to the home network 108 (decision 310). As a result of the proxy recipient program 124 determining that the portable smart device 120 is connected to the home network 108 (decision 310, "YES" branch), the proxy recipient program 124 may perform a first set of operations. As a result of the proxy recipient program 124 determining that the portable smart device 120 is connected to the outside network 118 (decision 310, "NO" branch), the proxy recipient program 124 may perform a second set of operations.

To further illustrate the first set of operations of the proxy recipient program 124, reference is now made to an illustrative exemplary embodiment. According to the illustrative exemplary embodiment, the portable smart device 120 and the stationary smart device 130 may both be connected to the home network 108. For illustrative purposes, the portable smart device 120 may not be connected to the outside network 118 during this time. However, those skilled in the art will understand that the stationary smart device 130 may be configured with one or more network communication protocols (e.g., WiFi) while the portable smart device 120 may also be configured with the same one or more network communication protocols (e.g., WiFi) as well as other network communication protocols (e.g., cellular). Thus, the portable smart device 120 may be connected to both the home network 108 and the outside network 118 at the same time.

As a result of the portable smart device 120 being connected to the home network, the proxy recipient program 124 may broadcast a discovery signal (step 315). The discovery signal may provide an indication to the stationary smart device 130 that the portable smart device 120 is currently connected to the home network 108 and that the delegation feature according to the exemplary embodiments is available for use.

While connected to the home network 108, the proxy recipient program 124 may perform a plurality of sets of operations related to processing requests for data exchanges and managing downloads that may have been received. With regard to processing requests for data exchanges, the proxy recipient program 124 may determine whether a proxy download request has been received from the stationary smart device 130 (decision 320). As a result of the proxy recipient program 124 not receiving any proxy download requests while the portable smart device 120 is connected to the home network 108 (decision 320, "NO" branch), the proxy recipient program 124 may maintain a current queue of proxy download requests.

As a result of the proxy recipient program 124 receiving a proxy download request from the stationary smart device 130 (decision 320, "YES" branch), the proxy recipient program 124 may determine a placement of the proxy download request in the queue of proxy download requests (step 325). The proxy recipient program 124 may utilize a plurality of different parameters to determine a priority with which the queue is managed. Based on an ordering of the proxy download requests, the proxy recipient program 124 may receive corresponding downloads based on the ordering in the queue. The proxy recipient program 124 may update the queue which reflects the placement of the proxy download request in the queue. The proxy recipient program 124 may determine whether there are any further proxy download requests that are received (decision 335). As a result of the proxy recipient program 124 receiving no further proxy download requests (decision 335, "NO" branch), the proxy recipient program 124 may continue with the updated queue.

As a result of the proxy recipient program 134 receiving at least one further proxy download request (decision 335, "YES" branch), the proxy recipient program 134 may continue to update the queue until no further proxy download requests are received.

According to the previously introduced exemplary embodiment, the stationary smart device 130 may transmit a proxy download request to the proxy recipient program 124. The proxy recipient program 124 may determine various types of information that is included in the proxy download request. For example, the proxy recipient program 124 may identify a size of a download that is to be received for the proxy download request. The proxy recipient program 124 may manage the queue based on a size of the downloads that are to be received for each proxy download request with downloads having a largest size having a highest priority. A queue of the proxy recipient program 124 may include five proxy download requests. The proxy download request received from the stationary smart device 130 may correspond to a download that has a third largest file size among the six total proxy download requests. Accordingly, the proxy recipient program 124 may position the proxy download request third in line in the queue.

While connected to the home network 108, the proxy recipient program 124 may perform a plurality of sets of operations related to processing requests for data exchanges and managing downloads that may have been received. With regard to managing downloads that may have been received, the proxy recipient program 124 may determine whether a request is received from the stationary smart device 130 to transmit a download corresponding to a previously received proxy download request (decision 340). As a result of a transmit request not being received (decision 340, "NO" branch), the proxy recipient program 124 may retain any download or portion thereof in the memory arrangement 122. As a result of a transmit request being received from the stationary smart device 130 (decision 340, "YES" branch), the proxy recipient program 124 may identify a corresponding download requested by the stationary smart device 130 (step 345). As described above with regard to the method 200 of FIG. 2, the stationary smart device 130 may determine when a download is completed based on whether a proxy download request was previously transmitted, added to the queue, and subsequently removed from the queue. Thus, the proxy recipient program 124 may receive the transmit request from the stationary smart device 130 when the download has been completely received by the portable smart device 120. Accordingly, the proxy recipient program 124 may transmit the download to the stationary smart device 130 using the intranet of the home network 108 (step 350). Once the download has been completely transmitted to the stationary smart device 130, the proxy recipient program 124 may delete the download from the memory arrangement 122. The proxy recipient program 134 may determine whether there are any further transmit requests that are received (decision 355). As a result of the proxy recipient program 134 receiving no further transmit requests (decision 355, "NO" branch), the proxy recipient program 134 may retain any remaining data in the memory arrangement 122. As a result of the proxy recipient program 134 receiving at least one further transmit request (decision 355, "YES" branch), the proxy recipient program 134 may continue to transmit completed downloads to the respective stationary smart device 130.

With reference again to the previously introduced exemplary embodiment, the stationary smart device 130 may have determined that a proxy download request was transmitted at a previous time that the portable smart device 120 and the stationary smart device 130 were connected to the home network 108. Upon discovering the portable smart device 120 back on the home network 108, the portable smart device 120 may have transmitted information regarding a current queue. The stationary smart device 130 may have determined that the proxy download request that was added to the queue is now absent. Accordingly, the portable smart device 130 may have completely received the download corresponding to the absent proxy download request. The stationary smart device 130 may transmit a transmit request to the portable smart device 120. As a result of receiving the transmit request, the proxy recipient program 124 may identify the download that is being requested to be transmitted. For example, the transmit request may include information corresponding to the previously transmitted and now absent proxy download request, information identifying the stationary smart device 130, etc. Once identified, the proxy recipient program 124 may transmit the identified download to the stationary smart device 130 via the intranet of the home network 108.

Returning to decision 310, as a result of the proxy recipient program 124 determining that the portable smart device 120 is connected to the outside network 118 (decision 310, "NO" branch), the proxy recipient program 124 may perform a second set of operations. The proxy recipient program 124 may identify the proxy download requests in the queue (step 360). While the portable smart device 120 was connected to the home network 108 at any previous time, the proxy recipient program 124 may have received one or more proxy download requests from the stationary smart device 130. While currently connected to the outside network 118, the proxy recipient program 124 may begin processing the proxy download requests in the queue by requesting downloads corresponding to each proxy download request. The proxy recipient program 124 may therefore determine whether there are any proxy download requests in the queue (decision 365). As a result of there being no proxy download requests in the queue (decision 365, "NO" branch), the proxy recipient program 124 may await returning to the home network 108. As a result at least one proxy download request in the queue (decision 365, "YES" branch), the proxy recipient program 124 begins processing the queue.

To further illustrate the first set of operations of the proxy recipient program 124, reference is now made to an illustrative exemplary embodiment. According to the illustrative exemplary embodiment, the portable smart device 120 may determine that there are six proxy download requests from one or more of the stationary smart devices 130 included in the queue. The portable smart device 120 may be positioned in an operating area of the outside network 118 which has access to the Internet (e.g., connected to a WiFi network that is capable of connecting to the Internet).

With at least one proxy download request in the queue, the proxy recipient program 124 may select a proxy download request in the queue and receive a download corresponding to the selected proxy download request through the outside network 118 (step 370). The proxy recipient program 124 may select the proxy download request based on a priority in which the proxy download requests are listed in the queue. Once selected, the proxy recipient program 124 may utilize the outside network 118 and begin receiving a corresponding download. The proxy recipient program 124 may monitor a progress with which the download is received and determine whether the download has been completely received (decision 375). If the download is yet incomplete and the portable smart device 120 is connected to the outside network 118 (decision 375, "NO" branch), the proxy recipient program 124 continues to receive the download. If the download has been completely received and the portable smart device 120 is connected to the outside network 118 (decision 375, "YES" branch), the proxy recipient program 124 may remove the proxy download request corresponding to the completely received download from the queue and determine whether there are any remaining proxy download requests in the queue (decision 365). The proxy recipient program 124 may continue this process of receiving downloads for proxy download requests in the queue whenever the portable smart device 120 is connected to the outside network 118 in a continuous manner or in discrete network connection sessions.

Referring now to the previously introduced, illustrative exemplary embodiment, the proxy recipient program 124 may select a first proxy download request having a corresponding first download with the largest file size. The proxy recipient program 124 may receive the first download while connected to the outside network 118. Once the first download has completed, the proxy recipient program 124 may remove the first proxy download from the queue. The proxy recipient program 124 may select a second proxy download having a corresponding second download with the now largest file size. While receiving the second download, the portable smart device 120 may disconnect from the outside network 118. However, the portable smart device 120 may re-establish a connection to the outside network 118 (e.g., moving from a first non-home WiFi network to a second non-home WiFi network). The proxy recipient program 124 may resume receiving the second download while connected to the outside network 118.

There may be a plurality of different use cases in which the delegation feature according to the exemplary embodiments may be used. The exemplary embodiments described above may relate to an appliance requiring an update that may be included in a relatively large file. With the appliance being configured to only use a data capped network, the delegation feature according to the exemplary embodiments may allow a portable smart device to receive the update on behalf of the appliance when the portable smart device has access to a further network. The exemplary embodiments may be utilized in further scenarios. For example, a user may not have a relatively fast data transmission speed on the home network 108 (e.g., still on ISDN). However, the user still wishes to download applications that may be relatively large in file size. Thus, the user may use a smart phone while on a network having an acceptable data transmission speed to receive the application in a reasonable amount of time. In a further example, a desktop diagnostic software may put a request for information from an automobile's closed network that a smart phone may only access via a near field communication.

The exemplary embodiments are configured to allow a first device to receive a download through a proxy request in which a second device receives a proxy download request corresponding to the download while the first and second devices are connected to a common network. When the second device connects to a further network, the second device may receive the download that is to be received by the first device. When the first and second devices are again connected to the common network, the second device may transmit the download to the first device.

Figure 4:
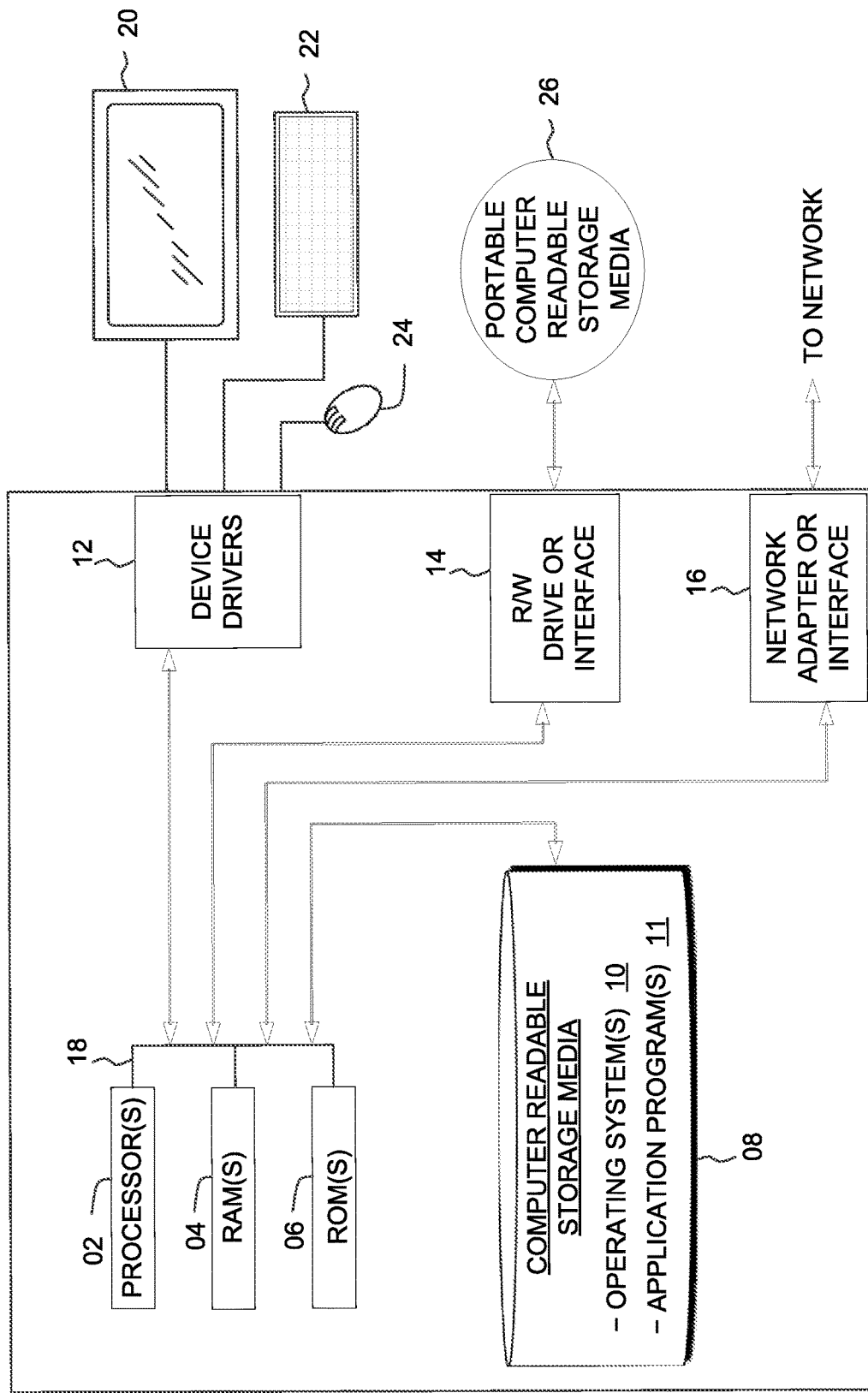
FIG. 4 depicts an exemplary block diagram depicting the hardware components of the delegation system 100 of FIG. 1, in accordance with the exemplary embodiments.

FIG. 4 depicts a block diagram of devices within the delegation system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
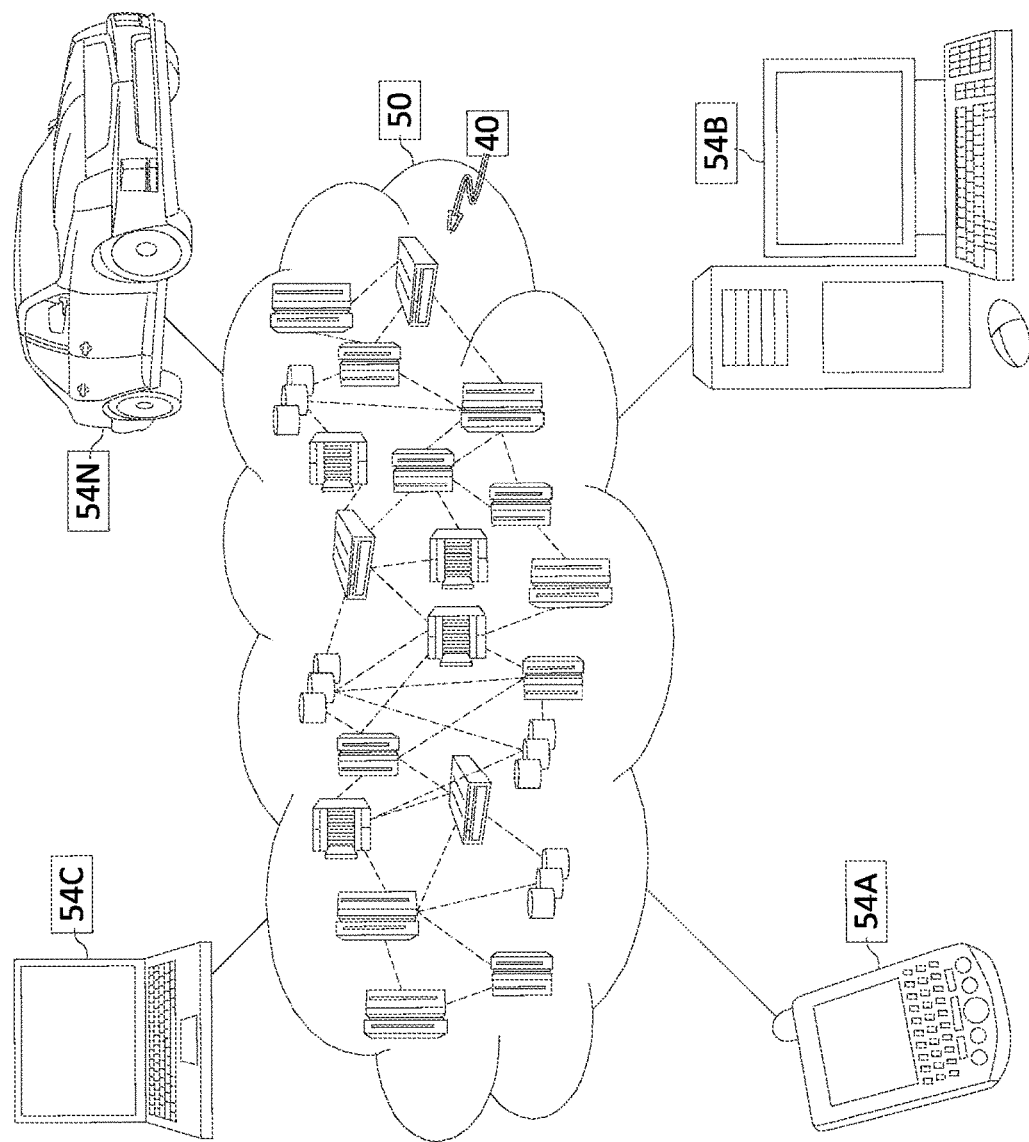
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
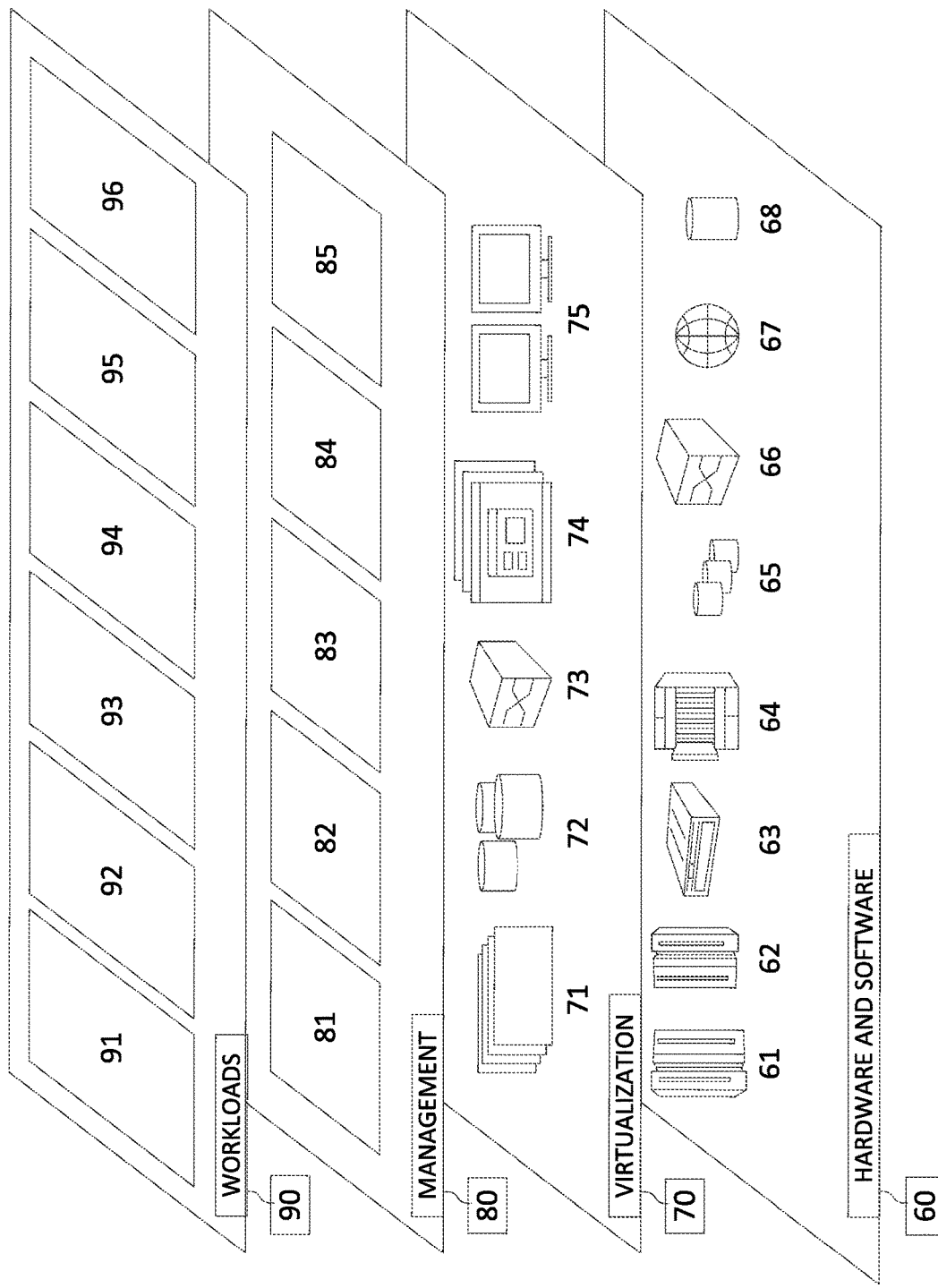
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delegation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method performed by a portable smart device for a stationary smart device to delegate the portable smart device to download data, the method comprising:
   receiving, by the portable smart device, a proxy download request from a stationary smart device via a data capped network, wherein the proxy download request identifies a download that the stationary smart device is to receive from a source on the internet, and wherein the proxy download request further includes a unique identifier associated with the stationary smart device, credentials to access the portable smart device, a relative urgency with which the download is to be received, a timestamp of when the download was available from the source, a number of times that the stationary smart device has requested a delegation of the download, and a size of the download;
   in response to the portable smart device connecting to a public network, receiving via the public network, by the portable smart device, the download identified by the proxy download request; and
   transmitting, by the portable smart device, the download to the stationary smart device via the data capped network without impacting a data limit of the data capped network.

2. The computer-implemented method according to claim 1, further comprising:
   broadcasting a discovery signal, by the portable smart device, in response to connecting to the data capped network, wherein the discovery signal indicates to the stationary smart device that the portable smart device is connected to the data capped network.

3. The computer-implemented method according to claim 1, further comprising:
   adding, by the portable smart device, the proxy download request to a queue of proxy download requests;
   in response to receiving an entirety of the download identified by the proxy download request, removing, by the portable smart device, the proxy download request from the queue.

4. The computer-implemented method according to claim 1, wherein the portable smart device has access to both the data capped network and the public network.

5. The computer-implemented method according to claim 1, wherein the stationary smart device is configured to only access the data capped network.

6. A computer-implemented method performed by a portable device for a stationary device to delegate the portable device to download data, the method comprising:
   receiving, by the portable device, a proxy download request from a stationary device over a data capped network, wherein the proxy download request identifies the data that the stationary device is to receive from a source on the internet, and wherein the proxy download request further includes a unique identifier associated with the stationary device, credentials to access the portable device, a relative urgency with which the download is to be received, a timestamp of when the download was available from the source, a number of times that the stationary device has requested a delegation of the download, a size of the download;
   in response to the portable device connecting to a public network, receiving over the public network, by the portable device, the data identified by the proxy download request; and
   transmitting, by the portable device, the data to the stationary device over the data capped network.

7. The computer-implemented method according to claim 6, further comprising:
   broadcasting a discovery signal, by the portable device, in response to connecting to the data capped network, wherein the discovery signal indicates to the stationary device that the portable device is connected to the data capped network.

8. The computer-implemented method according to claim 6, further comprising:
   adding, by the portable device, the proxy download request to a queue of proxy download requests;
   in response to receiving an entirety of the download identified by the proxy download request, removing, by the portable device, the proxy download request from the queue.

9. The computer-implemented method according to claim 6, wherein the portable device has access to both the data capped network and the public network.

10. The computer-implemented method according to claim 6, wherein the stationary device is configured to only access the data capped network.

11. A computer-implemented method performed by a portable device for a plurality of stationary device to delegate the portable device to download data, the method comprising:
   receiving, by the portable device, a proxy download request from each of the plurality of stationary devices via a data capped network, wherein the proxy download request identifies a software update that each of the plurality of stationary devices is to receive from a source on the internet, and wherein the proxy download request further includes a unique identifier associated with each of the plurality of stationary device, credentials to access the portable device, a relative urgency with which the download is to be received, a timestamp of when the download was available from the source, a number of times each of the plurality of stationary device has requested a delegation of the download, and a size of the download;

in response to the portable device connecting to a public network, receiving via the public network, by the portable device, the software update download identified by the proxy download request for each of the plurality of stationary devices; and transmitting, by the portable device, the respective software update to each of the plurality of stationary devices via the data capped network without impacting a data limit of the data capped network.

12. The computer-implemented method according to claim 11, further comprising:
broadcasting a discovery signal, by the portable device, in response to connecting to the data capped network, wherein the discovery signal indicates to the plurality of stationary devices that the portable device is connected to the data capped network.

13. The computer-implemented method according to claim 11, further comprising:
adding, by the portable device, the proxy download request to a queue of proxy download requests;
in response to receiving an entirety of the download identified by the proxy download request, removing, by the portable device, the proxy download request from the queue.

14. The computer-implemented method according to claim 11, wherein the portable device has access to both the data capped network and the public network.

15. The computer-implemented method according to claim 11, wherein the plurality of stationary devices is configured to only access the data capped network.

* * * * *